(12) United States Patent
Onji et al.

(10) Patent No.: US 11,299,076 B2
(45) Date of Patent: Apr. 12, 2022

(54) SEAT

(71) Applicant: DELTA KOGYO CO., LTD., Hiroshima (JP)

(72) Inventors: Atsushi Onji, Hiroshima (JP); Takafumi Fujino, Hiroshima (JP); Yohei Nagato, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 17/252,059

(22) PCT Filed: Oct. 17, 2019

(86) PCT No.: PCT/JP2019/040882
§ 371 (c)(1),
(2) Date: Dec. 14, 2020

(87) PCT Pub. No.: WO2020/105329
PCT Pub. Date: May 28, 2020

(65) Prior Publication Data
US 2021/0261027 A1 Aug. 26, 2021

(30) Foreign Application Priority Data
Nov. 21, 2018 (JP) .............................. JP2018-218182

(51) Int. Cl.
*A47C 7/24* (2006.01)
*B60N 2/58* (2006.01)

(52) U.S. Cl.
CPC ......... *B60N 2/5825* (2013.01); *B60N 2/5883* (2013.01)

(58) Field of Classification Search
CPC .. B60N 2/5825; B60N 2/5883; B60N 2/5891; B60N 2/60; B60N 2/58
See application file for complete search history.

(56) References Cited

U.S. PATENT DOCUMENTS 5,628,545 A 5/1997 Perthuis et al.
8,272,697 B2 * 9/2012 Mashimo ............. B60N 2/5891
297/452.62

(Continued)

FOREIGN PATENT DOCUMENTS

EP 0 597 756 A1 5/1994
EP 2 862 746 A1 4/2015

(Continued)

OTHER PUBLICATIONS

International Search Report issued in PCT/JP2019/040882; dated Dec. 10, 2019.

(Continued)

*Primary Examiner* — Shin H Kim
(74) *Attorney, Agent, or Firm* — Studebaker & Bracket PC

(57) ABSTRACT

A seat has a seat cushion unit including: a seat cushion frame; a seat pad which lies over the seat cushion frame; and a trim which covers the seat pad. The trim includes: a trim main body which mainly covers a top surface of the seat pad; a first trim joiner which extends from the trim main body to a backside of the seat cushion frame at the rear of the seat pad, and is fastened to the seat cushion frame; and a second trim joiner which is connected to a back surface of the trim main body in at least one of left and right end regions of the rear of the seat cushion unit, extends to the backside of the seat cushion frame at the rear of the seat pad, and is fastened to the seat cushion frame.

11 Claims, 6 Drawing Sheets

(56) References Cited

U.S. PATENT DOCUMENTS

| | | | |
|---|---|---|---|
| 8,845,031 B2* | 9/2014 | Sasaki | B60N 2/5825 |
| | | | 297/452.59 |
| 8,991,934 B2* | 3/2015 | Sei | B60N 2/5825 |
| | | | 297/452.6 |
| 9,981,580 B2* | 5/2018 | Kumagai | B60N 2/68 |
| 10,343,566 B2* | 7/2019 | Yokoyama | B60N 2/72 |
| 10,730,417 B2* | 8/2020 | Inoue | B60N 2/6009 |
| 2005/0173964 A1* | 8/2005 | Takezawa | B60N 2/5825 |
| | | | 297/452.6 |
| 2009/0295215 A1* | 12/2009 | Galbreath | B60N 2/2887 |
| | | | 297/452.6 |
| 2010/0181818 A1 | 7/2010 | Mashimo | |
| 2011/0049948 A1 | 3/2011 | Hobl et al. | |
| 2013/0249269 A1* | 9/2013 | Sasaki | B60N 2/5816 |
| | | | 297/452.18 |
| 2015/0097406 A1* | 4/2015 | Tanaka | B60N 2/757 |
| | | | 297/378.1 |
| 2017/0113584 A1* | 4/2017 | Kumagai | B60N 2/686 |
| 2017/0240082 A1* | 8/2017 | Yokoyama | A47C 31/023 |
| 2017/0327021 A1 | 11/2017 | Okui et al. | |
| 2019/0176665 A1* | 6/2019 | Inoue | B60N 2/5883 |
| 2019/0344691 A1* | 11/2019 | Liau | B29C 43/18 |
| 2019/0359163 A1* | 11/2019 | Yang | B60R 21/2165 |
| 2020/0194935 A1* | 6/2020 | Gallagher | H01R 13/639 |
| 2021/0253004 A1* | 8/2021 | Nojima | B60N 2/90 |
| 2021/0261027 A1* | 8/2021 | Onji | A47C 31/023 |

FOREIGN PATENT DOCUMENTS

| | | |
|---|---|---|
| FR | 2 902 719 A1 | 12/2007 |
| JP | H04-89084 A | 3/1992 |
| JP | 2004-254889 A | 9/2004 |
| JP | 2009-022534 A | 2/2009 |
| JP | 2017-190035 A | 10/2017 |
| JP | 2018-007717 A | 1/2018 |
| WO | 2013/073931 A1 | 5/2013 |
| WO | 2016098672 A1 | 6/2016 |

OTHER PUBLICATIONS

The extended European search report issued by the European Patent Office dated Jan. 25, 2022, which corresponds to European Patent Application No. 19887814.2-1012 and is related to U.S. Appl. No. 17/252,059.

* cited by examiner

SEAT

TECHNICAL FIELD

The present invention relates to a seat.

BACKGROUND ART

It has been conventionally known that, for example, as disclosed in Patent Literature 1, a vehicle seat includes a seat cushion unit composed of: a seat cushion frame; a seat pad (a cushion material) lying thereon; and a trim (a surface cover) which covers the seat pad.

In the seat cushion unit, the trim has a periphery (an end portion) extending to a backside of the seat cushion frame and fastened thereto. In this way, the trim tightly covers the seat pad.

The seat cushion unit can have bulge parts respectively on left and right sides of a sifting part which receives buttocks of an occupant for supporting the buttocks from left and right sides thereof. In this case, the trim is pulled into the seat pad side along a boundary between the sitting part and each of the bulge parts, thereby tightly covering the seat pad without any gap against the seat pad.

Meanwhile, the sitting part of the seat cushion unit in such a vehicle seat may have an intended uneven surface from the viewpoints of improved comfortability and designability. For instance, the trim is pulled widthwise into the seat pad side at a plurality of positions of a specific part of the trim that corresponds to the sitting part in a front-rear direction thereof. The pull-in action achieves the uneven surface of the sitting part.

However, there is a possibility that a crease occurs in the trim at the rear of the bulge part after the pull-in action is executed widthwise in a rear portion of the sitting part in the aforementioned manner. Specifically, as the vehicle seat is assembled with a reclining mechanism, the bulge part normally has a smaller width at the rear of the seat cushion unit than at the front thereof, and has a weaker repulsive force of the seat pad than the remaining parts. For this reason, the pull-in action executed widthwise in the rear portion of the sitting part in the aforementioned manner may cause, in the trim, creases extending from the longitudinally opposite ends of a pull-in section formed by the pull-in action at the rears of the bulge parts, resulting in poor appearance.

CITATION LIST

Patent Literature

Patent Literature 1: Japanese Patent Application Laid-Open No. 2017-190035

SUMMARY OF INVENTION

The present invention has been accomplished in view of the aforementioned drawback, and has an object to provide a technology of suppressing an occurrence of a crease in a trim at the rear of a bulge part of a seat cushion unit.

A seat according to the present invention has a seat cushion unit including: a seat cushion frame; a seat pad which lies over the seat cushion frame; and a trim which covers the seat pad. The trim includes: a trim main body which mainly covers a top surface of the seat pad; a first trim joiner which extends from the trim main body to a backside of the seat cushion frame at the rear of the scat pad, and is fastened to the seat cushion frame; and a second trim joiner which is connected to a back surface of the trim main body in at least one of left and right end regions of the rear of the seat cushion unit, extends to the backside of the seat cushion frame at the rear of the seat pad, and is fastened to the seat cushion frame.

DESCRIPTION OF EMBODIMENTS

Hereinafter, an embodiment of the present invention will be described in detail with reference to the accompanying drawings.

[Overall Configuration of Seat]

Figure 1:
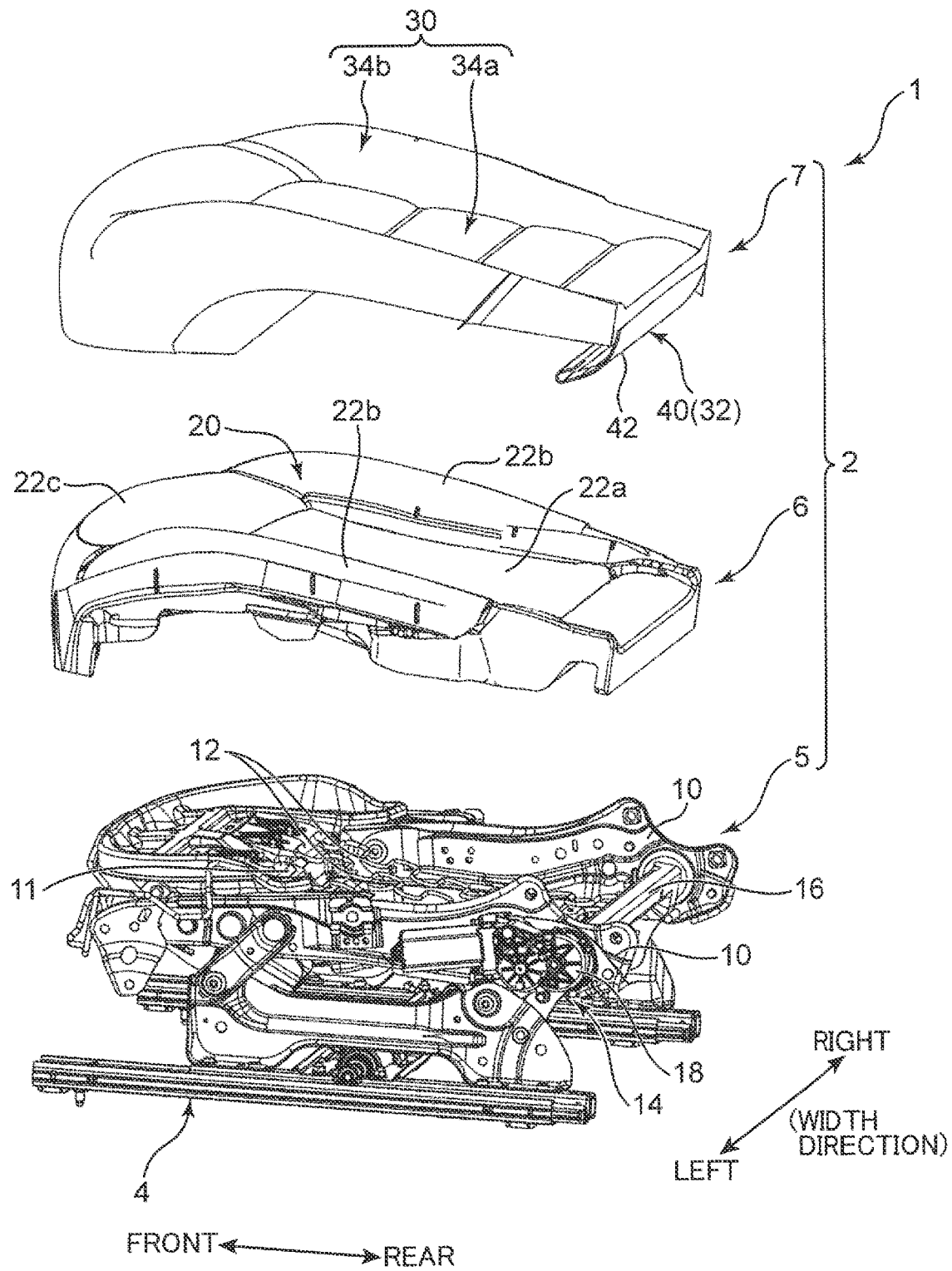
FIG. 1 is an exploded perspective view of a seat cushion unit of a seat according to the present invention.
Figure 2:
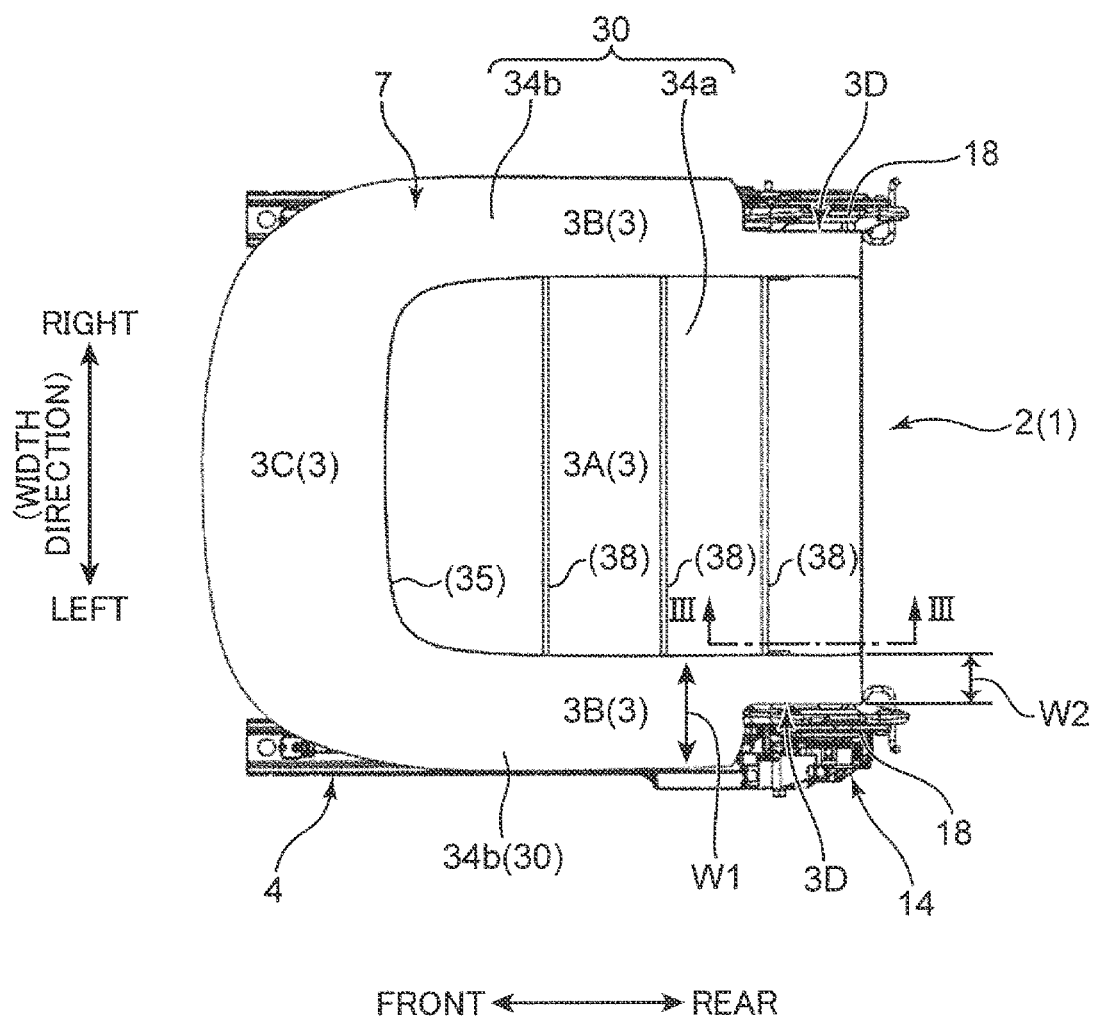
FIG. 2 is a plan view of the seat cushion unit.

FIG. 1 is an exploded perspective view of a seat cushion unit of a seat according to the present invention. FIG. 2 is a plan view of the seat cushion unit. The directions indicated by a front-rear direction, a left-right direction, and an up-down direction as used in the description below are defined with respect to the seat except a specific case particularly mentioned. Further, the left-right direction is also referred to as a width direction.

A seat 1 is a seat for automobile, and includes a seat cushion unit 2 for allowing an occupant to sit thereon, an unillustrated seatback unit for receiving the hack of the occupant leaning thereagainst, and a slide mechanism 4 for supporting the seat cushion unit 2 slidably along a floor panel of a vehicle body in the front-rear direction.

The seat cushion unit 2 includes a seat cushion frame 5 serving as its basic structure, a seat pad (a cushion material) 6 which lies over the seat cushion frame, and a trim (a surface cover) 7 which covers the seat pad 6. Although not shown, the seatback unit similarly includes a seathack frame serving as its basic structure, a seat pad fixedly attached thereto, and a trim which covers the seat pad.

The seat cushion frame 5 includes a pair of left and right side plates 10, cross pipes 11 interposed therebetween to connect the two side plates 10 with each other at different positions in the front-rear direction, and a plurality of support springs 12 laid across the cross pipes 11. The seat cushion frame 5 is supported by the slide mechanism 4. in this configuration, the seat cushion frame 5 is slidable along the floor panel of the vehicle body in the front-rear direction.

Although not shown, the seatback frame similarly includes a pair of left and right side plates, unillustrated cross pipes interposed therebetween to connect the two side plates with each other at different positions in the up-down direction, and a plurality of support springs laid across the cross pipes.

A reclining mechanism 14 is provided at a rear end of the seat cushion frame 5. The seatback frame is connected with the seat cushion frame 5 via the reclining mechanism 14. in other words, the seatback unit is coupled to the seat cushion unit 2.

The reclining mechanism 14 can adjust an angle of the seatback unit to the seat cushion unit 2. For instance, the reclining mechanism 14 includes a connecting shaft 16 which rotatably connects the side plates 10 of the seat cushion frame 5 and the side plates of the seatback frame with each other, an unillustrated pair of left and right spiral springs which rotationally urges the seatback frame frontward, a pair of left and right ratchet mechanisms 18 which locks the seathack frame at a desired angle position, and an unillustrated reclining lever for releasing the lock state made by the ratchet mechanisms 18.

The reclining lever in the embodiment is rotatably supported by the left side plate 10 of the seat cushion frame 5 and coupled to the left ratchet mechanism 18. The left and right ratchet mechanisms 18 are connected with each other via the connecting shaft 16, and the lock state of the ratchet mechanisms 18 can be released synchronizedly with an operation of the reclining lever.

As shown in FIG. 2, the seat cushion unit 2 includes a sitting part 3A for receiving the buttocks of the occupant, a pair of side bulge parts 3B respectively located on left and right sides of the sitting part 3A, and a front bulge part 3C located in. front of the sitting part 3A. The sitting part 3A and the bulge parts 3B, 3C define a top surface, i.e., a seat surface 3, of the seat cushion unit 2. Here, each of the side bulge parts 3B in the embodiment corresponds to a "bulge part" of the present invention.

The side bulge parts 3B support the buttocks of the occupant on the sitting part 3A from left and right sides thereof. The front bulge part 3C mainly supports the thighs of the occupant on the sitting part 3A from below. Each of the bulge parts 3B, 3C has a surface inclined upward as advancing outward from the sitting part 3A. An inclination angle of the front bulge part 3C to the sitting part 3A is set at a value smaller than an. inclination angle of the side bulge part 3B so as not to give the occupant a discomfort.

Further, as shown in FIG. 2, each of the side bulge parts 3B has a cut-out 3D in a rear end portion thereof to avoid interference with the corresponding ratchet mechanism 18. Therefore, the rear end portion of the side bulge part 3B has a width W2 which is smaller than a width W1 of a front portion of the side bulge part 3B.

The seat pad 6 is configured to cover the seat cushion frame 5 from above, and its entirety is integrally made of a resin material, such as urethane foam, having resilience. The seat pad 6 has a top surface 20 provided with a sitting pad part 22a corresponding to the sitting part 3A, a pair of left and right side pad parts 22b corresponding to the side bulge parts 3B, and a front pad part 22c corresponding to the front bulge part 3C.

The trim 7 has a trim main body 30 configured to mainly cover the top surface 20 of the seat pad 6, and a trim joiner unit 32 for fastening the trim main body 30 to the seat cushion frame 5. The trim main body 30 is made of a leather. The trim joiner unit 32 is formed of a sheet member made of a synthetic fiber fabric or a non-woven fabric as described later.

The trim main body 30 includes: a center seat part 34a which defines the sitting part. 3A in combination with the sitting pad part 22a of the seat pad 6 by covering the sitting pad part 22a; and a periphery seat part 34b which defines the bulge parts 3B, 3C in combination with the side pad parts 22b and the front pad part 22c by covering the side pad parts 22b and the front pad part 22c.

The center seat part 34a and the periphery seat part 34b are independent from each. other. These parts have their respective ends sewn together, and accordingly a pull-in part 35 having a U-shape in a plan view and extending along a boundary between the center seat part 34a and the periphery seat part 34b is formed on a back surface of the trim main body 30 (see FIG. 4). The pull-in part 35 is pulled into the seat pad 6 side. Specifically, the pull-in part 35 is pulled into the seat pad 6 side by way of engagement with an unillustrated wire embedded in the seat pad 6 using a retainer such as a hog ring. In this manner, the trim 7 tightly covers the top surface 20 of the seat pad 6 provided with the plurality of pad parts 22a to 22c having different heights from one another without any gap against the top surface.

Figure 4:
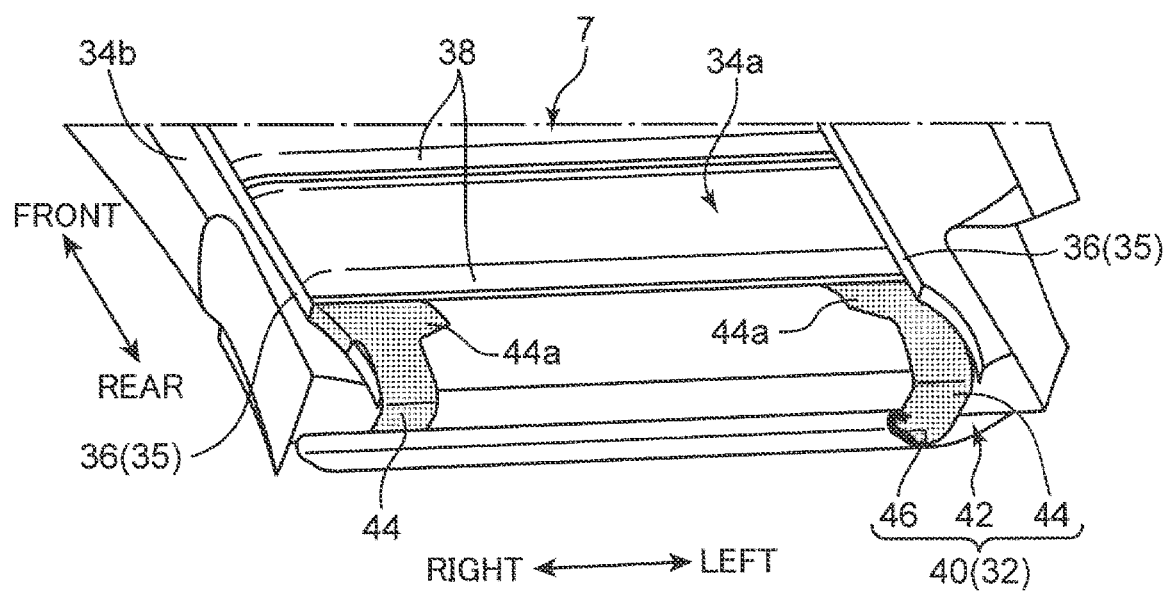
FIG. 4 is a perspective view of a backside of the trim, showing the rear trim joiner part.

Moreover, the center seat part 34a has a plurality of pull-in sections 38 extending throughout in the width direction thereof at intervals in the front-rear direction (see FIG. 4). The pull-in sections 38 are pulled into the seat pad 6 side in the same manner as the pull-in part 35. As a result, the sitting part 3A of the seat cushion unit 2 has bumps extending in the width direction at a plurality of positions in the front-rear direction.

The trim joiner unit 32 is a sheet-like joining member unit for fastening the trim main body 30 to the seat cushion frame 5 under a tension., and is provided in a peripheral end portion of the trim main body 30. The trim joiner unit 32 may be a part of an element for forming the trim main body 30 and integrated with the element, or may be independent from the element and fastened to the element (e.g., by way of sewing).

The trim joiner unit 32 includes: an unillustrated front trim joiner part which extends to the backside of the seat cushion frame 5 at the front of the seat pad 6 and is fastened to the seat cushion frame 5; an unillustrated side trim joiner part extending to the backside of the seat cushion frame 5 at a side of the scat pad 6 and is fastened to the seat cushion frame 5; and a rear trim joiner part 40 which extends to the backside of the seat cushion frame 5 at the rear of the seat pad 6 and is fastened to the seat cushion frame 5. Hereinafter, the rear trim joiner part 40 will be described in detail.

[Configuration of Rear Trim Joiner Part 40]

Figure 3:
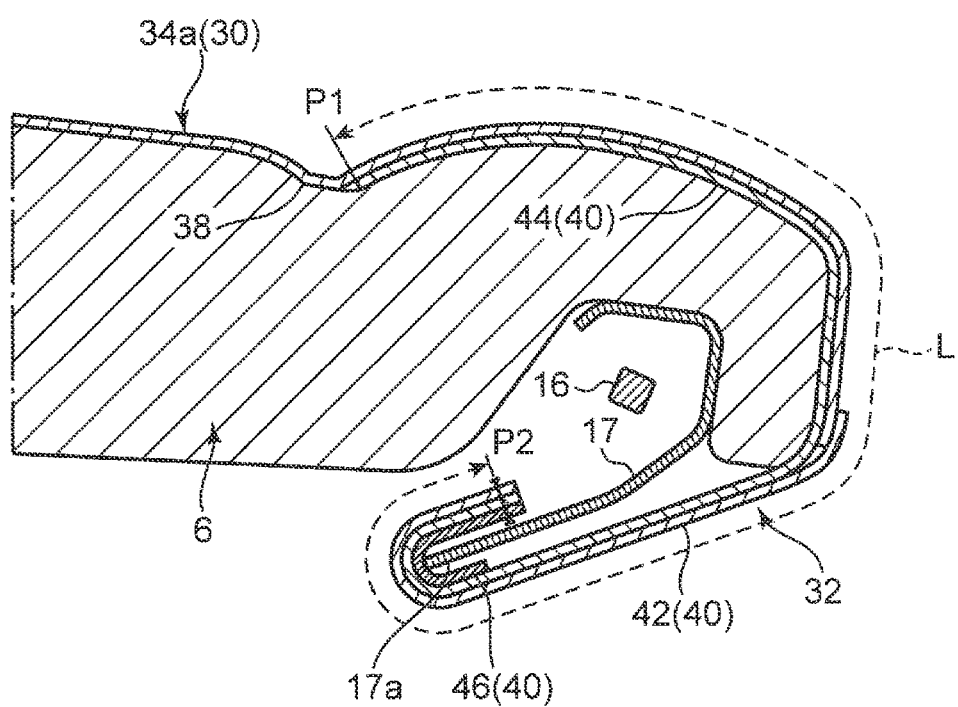
FIG. 3 is a cross-sectional view of the seat cushion unit showing a rear m joiner part cross-sectional view of the line III-III in FIG. 2)
Figure 5:
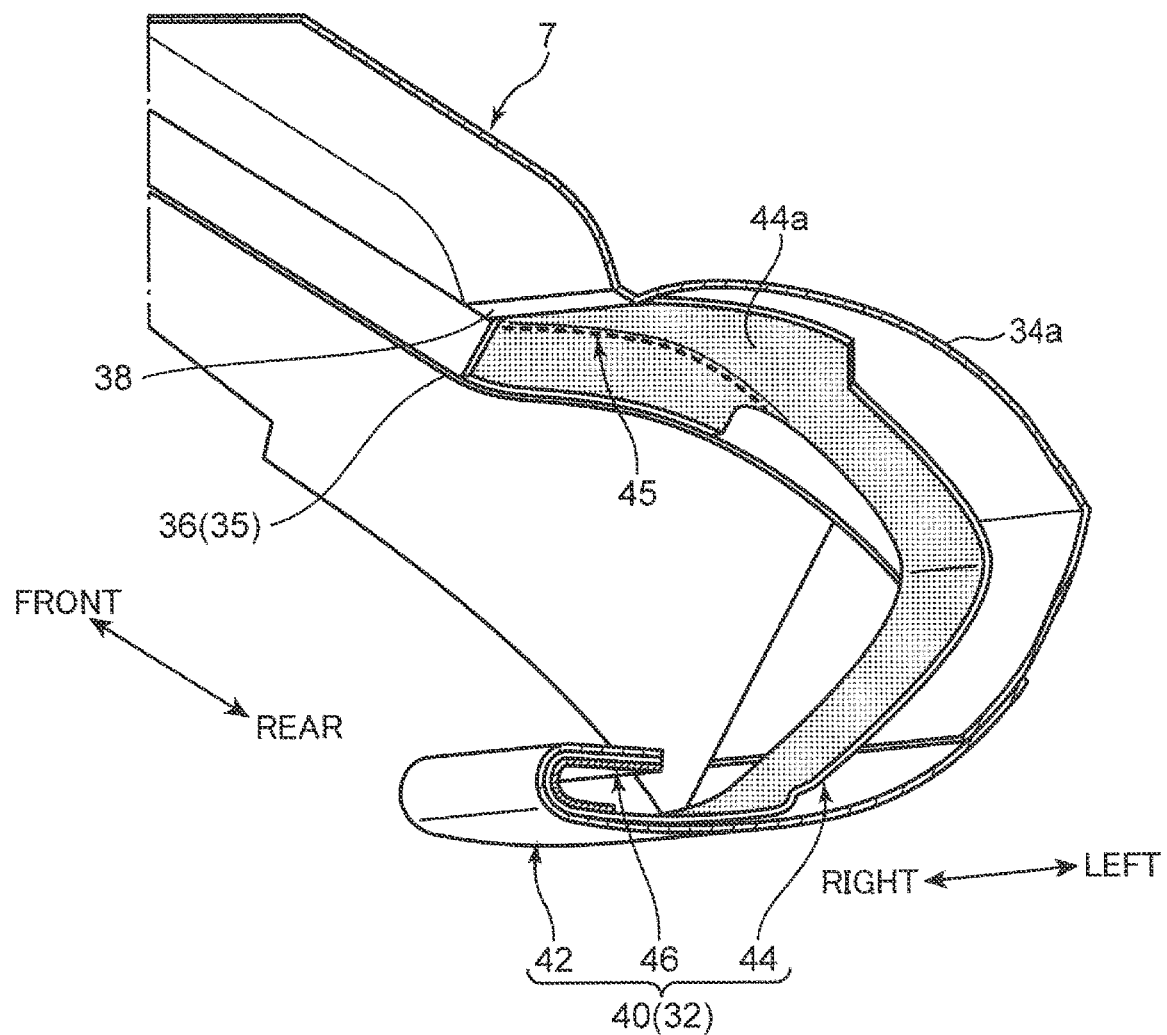
FIG. 5 is a perspective view of a main region on the backside of the trim, showing the rear trim joiner part.

FIG. 3 is a cross-sectional view of the seat cushion unit 2, showing, the rear trim joiner part 40. FIG. 4 is a perspective view of the backside of the trim, showing the rear trim joiner part 40. FIG. 5 is a perspective view of a main region on the backside of the trim, showing the rear trim joiner part 40.

As shown in FIGS. 1 and 3 to 5, the rear trim joiner part 40 includes: a first trim joiner 42 which extends throughout in the width direction of a rear end portion of the trim main body 30; a pair of left and right second trim joiners 44 respectively located at left and right ends of the rear end portion of the trim main body 30; and a hook member 46 integrally provided on distal end portions of the first and second trim joiners 42, 44.

The first trim joiner 42 is sewn with a top surface of the trim main body 30. The second trim joiners 44 are sewn with the back surface of the trim main body 30. The hook. member 46 is integrally sewn with the first and the second trim joiners 42, 44. The first trim joiner 42 may be a part of an element for forming the trim main body 30 and integrated with the element.

A width dimension of each of the second trim joiners 44 is sufficiently smaller than a width dimension of the first. trim joiner 42 (i.e., smaller than a width dimension of the rear end portion of the trim main body 30), specifically, is set at a one-eighth to one-tenth of the width dimension of the first trim joiner 42 in the embodiment.

Each of the first trim joiner 42 and the second trim joiners 44 is made of a sheet material of a synthetic fiber fabric or a non-woven fabric. However, the second trim joiner 44 is made of a material having a lower stretchability than that of the first trim joiner 42.

In this embodiment, the first trim joiner 42 is made of a sheet material of a non-woven fabric. The second trim joiner 44 is made of a sheet material called an airbag sleeve. The airbag sleeve is a sheet material of a synthetic fiber fabric (e.g., nylon cloth (N66)) coated with a silicone resin and therefore it is excellent in strength, incombustibility, and air tightness. The airbag sleeve is available as a sheet material fir fastening a trim to a frame to prevent the trim from being blown away from the frame by an impact of an automobile airbag when the airbag is inflated. Furthermore, the airbag sleeve is used as a sheet material for such an automobile airbag as well.

For the first trim joiner 42 in the embodiment, a sheet material (a non-woven fabric) having a basis weight of 99.5 g/m$^2$, a thickness of 0.56 mm, and an elongation rate of 72% in length and 65% in width at a tensile test conforming to "JIS (Japan Industrial Standard) L 1096" is adopted.

As for the second trim joiner 44, a sheet material (an airbag sleeve) having a basis weight of 202.4 g/m$^2$, a thickness of 0.33 mm, and an elongation rate of 29% in length and 31% in width at tensile tests conforming to "ISO13934-1" is adopted. The values are averages resulting from the following five-time tests:

First time: basis weight of 204.0 g/m$^2$, thickness of 0.33 mm, 29% in length, and 30% in width;

Second time: basis weight of 201.2 g/m$^2$, thickness of 0.33 mm, 29% in length, and 30% in width;

Third time: basis weight of 201.4 g/m$^2$, thickness of 0.32 mm, 29% in length, and 31% in width;

Fourth time: basis weight of 201.0 g/m$^2$, thickness of 0.32 mm, 29% in length, and 31% in width; and Fifth time: basis weight of 204.3 g/m$^2$, thickness of 0.33 mm, 28% in length, and 31% in width.

It should be noted here that "ISO13934-1" is a standard that is the basis of "JIS L 1096". Hence, the test conditions of the tensile tests under these standards are said to he equivalent. Additionally, in the tests of the airbag sleeve, the basis weight conforms to "ASTM D3776", and the thickness conforms to "ISO2286-3".

A relation between the length and the width of the sheet material (corresponding to the length and the width in the tensile tests), and the directions of the seat cushion unit 2 (the seat 1) is determined in accordance with a "yield" or an "elongation rate". For instance, in the case of the second trim joiners 44, the length of the airbag sleeve is set in the front-rear direction of the seat cushion unit 2 in the embodiment.

As shown in FIGS. 1 and 4, the first trim joiner 42 is sewn with the trim main body 30 along the top surface of the rear portion of the trim main body 30.

In contrast, as shown in FIGS. 3 to 5, the second trim joiners 44 respectively extend in the inside of specific sections, hereinafter referred to as side pull-in sections 36, of the U-shaped pull-in part 35 along the side pull-in sections 36, each of the pull-in sections 36 extending along the corresponding side bulge part 3B in the front-rear direction. In other words, the second trim joiners 44 are respectively located in left and right end regions of the rear of the seat cushion unit 2. An end of a proximal end portion of each of the second trim joiners 44 abuts a rearmost pull-in section 38 among the pull-in sections 38 at the center seat part 34a.

The proximal end portion 44a of the second trim joiner 44 has a larger width than the remaining portions thereof. A part of the proximal end portion 44a is sewn with each of the side pull-in sections 36 along a side surface of the side pull-in section 36 as shown in FIG. 5. Specifically, a part of the proximal end portion 44a is sewn with a base of the side pull-in section 36 along a direction (the front-rear direction) in which the side pull-in section 36 extends. Consequently, the second trim joiner 44 is connected with the trim main body 30. Here, the reference numeral 45 shown in FIG. 5 denotes stitches of the second trim joiner 44 to the side pull-in section 36. In. the embodiment, the side pull-in section 36 corresponds to a "pull-in section" of the present invention.

The hook member 46 is a plate-like member made of a resin material and having a U-shaped cross section, and extends along the distal end portion of the first trim joiner 42 throughout in the width direction thereof.

The second trim joiners 44 overlap the widthwise opposite ends of the first trim joiner 42. The hook member 46 overlies each of the second trim joiners 44 in such a way as to sandwich the second trim joiner 44 between the hook member 46 and the first trim joiner 42. A distal end of the first trim joiner 42 and a distal end of the second trim joiner 44 are aligned with each other, and the hook member 46 is also aligned with the distal ends of the first and the second trim joiners 42, 44. In this state, the first and the second trim joiners 42, 44 and the hook member 46 are integrally sewn together. However, it is not limited to sewing, the first and the second trim joiners 42, 44 and the hook member 46 may be integrally fastened to one another by way of other fastening way such as stapling.

The rear trim joiner part 40 having the above-described configuration extends to the backside of the seat cushion frame 5, and is fastened to the seat cushion frame 5 as shown in FIG. 3. Specifically, a plate member 17 made of a metal and having an end portion 17a extending frontward is provided between the pair of left and right side plates 10 in such a way as to surround the connecting shaft 16. A distal end portion of the rear trim joiner part 40, i.e., the hook member 46 is fastened to the end portion 17a of the plate member 17. The plate member 17 further engages with rear ends of the support springs 12.

It should be noted that, a length dimension L of the second trim joiner 44 denoted by a dashed arrow in FIG. 3, specifically, a length dimension from a joining position P1 between the trim main body 30 and the second trim joiner 44 to a joining position P2 between the hook member 46 and the first and second trim joiners 42, 44, is slightly shorter than a length dimension of the corresponding portion of the trim main body 30 and the first trim joiner 42. In other words, a distance from the joining position P1 (corresponding to a "proximal end joining position" in the present invention) of the second trim joiner 44 that is connected with the trim main body 30 to the joining position P2 (corresponding to a "distal end joining position" in the present invention) of the second trim joiner 44 that is retained by the hook member 46 is slightly shorter than the distance from the joining position P1 to the joining position P2 of the first trim joiner 42 that is retained by the hook member 46.

The rear trim joiner part 40 of the trim joiner unit 32 has a double structure including the two trim joiners, i.e., the first and the second trim joiners 42, 44. Although not shown, each of the remaining trim joiner parts, i.e., the front trim joiner part and the side trim joiner part, has a single structure including a single joiner, In this respect, the rear trim joiner part 40 has a structure different from those of the remaining joiner parts (the front trim joiner part and the side trim joiner part).

[Effects of the Invention]

As described above, the seat 1 according to the present invention has: the seat cushion unit 2 including: the seat cushion frame 5; the seat pad 6 which lies over the seat cushion frame 5; and the trim 7 which covers the seat pad 6. The trim 7 includes: the trim main body 30 which mainly covers the top surface 20 of the seat pad 6; the first trim joiner 42 which extends from the trim main body 30 to the backside of the seat cushion frame 5 at the rear of the seat pad 6, and is fastened to the seat cushion frame 5; and the second trim joiners 44 which are connected to the back surface of the trim main body 30 in the left and right end regions of the rear of the seat cushion unit 2, extend to the backside of the seat cushion frame 5 at the rear of the seat pad 6, and are fastened to the seat cushion frame 5.

Figure 6:
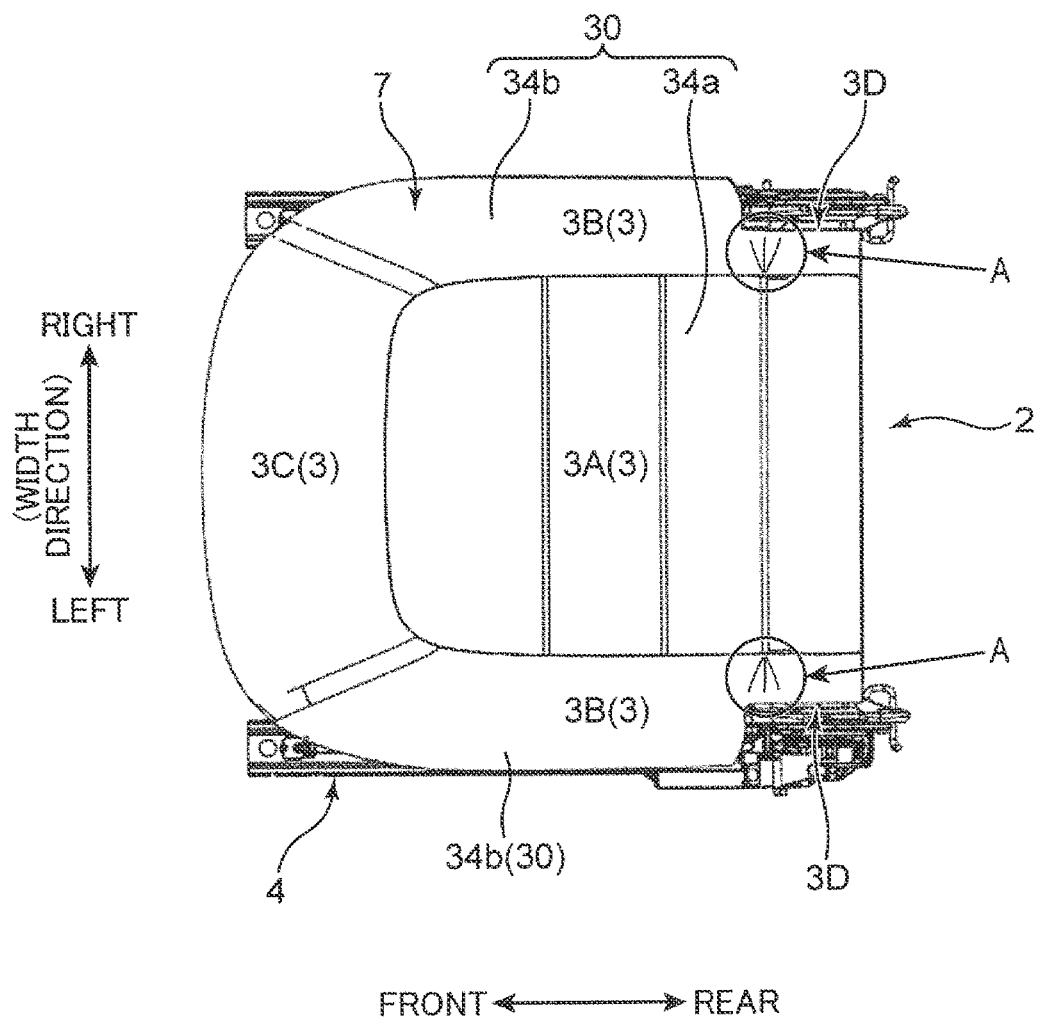
FIG. 6 is a plan view of the seat cushion unit where creases occur in the trim.

The seat 1 (the seat cushion unit 2) having this configuration can effectively suppress an occurrence of a crease in the trim 7 at the rear of the corresponding side bulge part 3B. Specifically, in the seat cushion unit 2, the width W2 of the rear end portion of the side bulge part 3B is smaller than the width W1 of the front portion of the side bulge part 3B, and further the pull-in. section 38 extending in the width direction along the portion having the width W2 is provided at the sitting part 3A (the center seat part 34a) as described above. In this configuration, for example, if the rear trim joiner part 40 has a single structure including only a single first trim joiner 42, creases extending from the opposite ends of the pull-in section 38 in the width direction would occur in a specific portion of the periphery seat part 34h of the trim 7 that covers the side bulge parts 3B as shown in the regions each denoted by the arrow A in FIG. 6 for the following reasons. That is, the narrower rear end portion (having the width \V2) of the side bulge part 3B receives a weaker repulsive force of the seat pad 6 than the remaining portions. Thus, widthwise pull-in action of pulling the center seat part 34a of the trim 7 (to form the pull-in section 38 extending in the width direction) results in drawing the periphery seat part 34b, and further deforming the periphery seat part 34b and the side pad part 22b. The deformation causes, in the trim 7 (the periphery seat part 34b), the creases extending from the longitudinal opposite ends of the pull-in section 38 at the side bulge part 3B.

However, in the seat 1 (the seat cushion unit 2) having the configuration according to the embodiment as described above, the rear trim joiner part 40 includes the pair of left and right second trim joiners 44 in addition to the first trim joiner 42. in this configuration, the trim 7 tightly covers the seat pad 6 in a state where the rear end portion of the trim 7 is tensioned rearward throughout in the width direction by the first trim joiner 42, and the portions thereof corresponding to the left and right end regions of the rear of the seat cushion unit 2 are tensioned rearward respectively by the pair of left and right second trim joiners 44. Such independent tensioning of the portions of the trim 7 corresponding to the left and right end regions of the rear of the seat cushion unit 2 by the corresponding second trim joiners 44 can effectively prevent creases from occurring in the regions each denoted by the arrow A shown in FIG. 6. The seat 1 (the seat cushion unit 2) having this configuration eventually can exert an improved appearance quality in the seat cushion unit 2.

Particularly, each of the second trim joiners 44 is connected to the side pull-in section 36 of the trim main body 30 that extends along the boundary between the corresponding side bulge part 3B and the sitting part 3A in the front-rear direction. The side pull-in section 36 is thus used to firmly tension the portions of the trim main body 30 corresponding to the left and right end regions of the rear of the seat cushion unit 2 rearward by the second trim joiners 44. Consequently, the seat 1 (the seat cushion unit 2) having this configuration can effectively suppress an occurrence of the aforementioned creases.

Moreover, in the configuration of the rear trim joiner part 40, the first trim joiner 42 and each of the second trim joiners 44 are fastened to the seat cushion frame 5 via the common hook member 46 which retains the end portion of the first trim joiner 42 and the end portion of the second trim joiner 44. This configuration allows the two trim joiners, i.e., the first trim joiner 42 and the second trim joiner 44, to be integrally fastened to the seat cushion frame 5 in assembling the seat. From this perspective, the rear trim joiner part 40 even having the double structure including the first trim joiner 42 and the pair of left and right second trim joiners 44 is advantageous in a good assembly workability.

Moreover, in the seat 1 (the seat cushion unit 2), the length dimension L of the second trim joiner 44 from the joining position P1 between the trim main body 30 and the second trim joiner 44 to the joining position P2 between the hook member 46 and the first and second trim joiners 42, 44 is shorter than the length dimension of the corresponding portion of the trim main body 30 and the first trim joiner 42. Therefore, the trim 7 can be firmly tensioned rearward by the second trim joiner 44 without receiving an influence of the first trim joiner 42. Particularly, the second trim joiner 44 is made of a material having a lower stretchability than that of the first trim joiner 42. The trim 7 can be favorably tensioned rearward by the second trim joiner 44 in this respect as well. Consequently, the seat 1 (the seat cushion unit 2) having this configuration. can effectively suppress an occurrence of the aforementioned creases.

[Other Modifications]

The seat 1 described heretofore shows an example of a preferable embodiment of a seat according to the present invention, and the specific configuration thereof is appropriately changeable without deviating the scope of gist of the present invention. For instance, the configurations described below are adoptable.

(1) Although the rear trim joiner part 40 in the embodiment includes the pair of left and right second trim joiners 44, the rear trim joiner part 40 may include only one of the left and right second trim joiners 44. For instance, in a case where one of the left and right cut-outs 3D in the seat cushion unit 2 has a smaller cutout degree and thus there is no risk of an occurrence of a crease at the corresponding side bulge part 3B (c.f., in one of the regions each denoted by the arrow A in FIG. 6), the second trim joiner 44 at the side bulge part 3B may be excludable.

Besides, the rear trim joiner part 40 may be configured to include a plurality of second trim joiners 44 at both the left and right ends, or at either the left or right end.

(2) The left and right second trim joiners 44 in the embodiment are arranged inside of the pair of left and right side pull-in sections 36 each extending along the boundary between the sitting part 3A and the corresponding side bulge part 38 in the front-rear direction on the back surface of the trim main body 30, but should not be limited to this arrangement. For instance, each of the second trim joiners 44 may be arranged outside of corresponding one of the left and right side pull-in sections 36.

(3) The rear trim joiner part 40 in the embodiment includes the common hock member 46 for the first trim joiner 42 and the second trim joiners 44. The first trim joiner 42, the second trim joiners 44, and the hook member 46 are integrally fastened to one another (sewn together). However, the configuration should not be limited thereto. For example, the first trim joiner 42 and each of the second trim joiners 44 may be independently retained by their respective hook members. Furthermore, each of the second trim joiners 44 may be retained by its own hook member, In this case, the fastening position of the first trim joiner 42 to the seat cushion frame 5 may be the same as or different from the fastening position of each of the second trim joiners 44 to the seat cushion frame 5.

(4) In the embodiment, the second trim joiner 44 is made of a sheet material (an airbag sleeve) having a low stretchability (a lower elongation rate than that of a non-woven fabric). However, the second trim joiner 44 may be made of a sheet material having a high stretchability after the stretchability is reduced by, for example, subjecting the seat material to straight firm sewing to thereby form stitches in. a direction (the length direction) in parallel to a tension direction.

(5) As described in the embodiment, a crease is likely to occur in the trim 7 particularly in a portion thereof corresponding to at least one of the left and right end regions of the rear of the seat cushion unit 2 (at the corresponding side bulge part 3B) in the seat 1 where the trim main body part 30 is pulled into the seat pad 6 side at the rear portion of the sitting part 3A throughout in a seat width direction of the sitting part 3A. Therefore, the configuration of the seat according to the present invention is particularly applicable to a seat where a trim is pulled into a seat pad at a rear portion of a sitting part throughout in a seat width direction thereof. Also, the configuration of the seat according to the present invention is absolutely applicable to a seat where a trim is not pulled at a rear end portion of a sitting part in the width direction thereof as well.

(6) The seat 1 according to the embodiment is a seat for automobile. However, the seat according to the present invention is also available as a seat for other vehicle such as airplane, train, vessel and the like, and further is available as a seat for sofa and leather chair to be arranged in a building, e.g., a house.

The present invention described heretofore will be summarized as follows.

A seat according to one aspect of the present invention includes: a seat cushion unit including: a seat cushion frame; a seat pad which lies over the seat cushion frame; and a trim which covers the seat pad, wherein the trim includes: a trim main body which mainly covers a top surface of the seat pad; a first trim joiner which extends from the trim main body to a backside of the seat cushion frame at a rear of the seat pad, and is fastened to the seat cushion frame; and a second trim joiner which is connected to a back surface of the trim main body in at least one of left and right end regions of the rear of the seat cushion unit, extends to the backside of the seat cushion frame at the rear of the seat pad, and is fastened to the seat cushion frame.

In this configuration, the trim tightly covers the seat pad in a state where a portion of the trim corresponding to at least one of the left and right end regions of the rear of the seat cushion unit is tensioned rearward by the second trim joiner independently of the first trim joiner. Such independent tensioning of the portion corresponding to the at least one of the left and right end regions of the rear of the seat cushion unit by the second trim joiner can effectively prevent a crease from occurring in the portion.

In the seat, it is preferable that the seat cushion unit includes a sitting part for supporting buttocks of an occupant, and a bulge part extending in a front-rear direction on each of left and right sides of the sitting part, and that the trim main body has a pull-in section which extends along a boundary between the bulge part and the sitting part, and is pulled into the seat pad side, and the second trim joiner is connected to the pull-in section.

In this configuration, the portion of the trim corresponding to at least one of the left and right end regions of the rear of the seat cushion unit can be firmly tensioned rearward by the second trim joiner with use of the pull-in section.

In this case, more specifically, the second trim joiner is preferably sewn with the pull-in section along a direction in which the pull-in section extends.

In this configuration, the pull-in section is tensioned by the second trim joiner along the direction in which the pull-in section extends, In this way, it is possible to tension the trim main body without any influence on the pulled state of the pull-in section.

In the seat, the first trim joiner and the second trim joiner are preferably fastened to a common member included in the seat cushion frame.

The configuration where the two trim joiners are fastened to the common member in this mariner can achieve a good workability in assembling the seat.

In this case, the first trim joiner and the second trim joiner are preferably fastened to the seat cushion frame via a common hook member which retains an end portion of the first trim joiner and an end portion of the second trim joiner.

In this configuration, the hook member fastened to the seat cushion frame permits the first and second trim joiners to be fastened to the seat cushion frame at the same time, so the workability in assembling the seat is accordingly further increased. Additionally, the first and the second trim joiners are fastened to the seat cushion frame at the same fastening position. As a result, a total fastening space necessary for the first and second trim joiners is consequently reduced.

In the seat, a distance from a proximal end joining position of the second trim joiner that is connected with the trim main body to a distal end joining position of the second trim joiner that is retained by the hook member is preferably shorter than a distance from the proximal joining position to a joining position of the first trim joiner that is retained by the hook member.

In this configuration, the trim can be firmly tensioned rearward by the second trim joiner without receiving any influence of the first trim joiner. This makes it possible to reliably suppress an occurrence of a crease in the portion of the trim corresponding to the at least one of the left and right end regions of the rear of the seat cushion unit.

In the seat, the second trim joiner preferably has a lower stretchability than the first trim joiner.

Even in this configuration, the trim can be firmly tensioned rearward by the second trim joiner without receiving any influence of the first trim joiner in the same manner as described above.

In this case, the second trim joiner is preferably made of an airbag sleeve.

The airbag sleeve is a material which is excellent in strength and incombustibility, and particularly has a low elongation rate, and hence is effective for the purpose of firmly tensioning the, trim.

The invention claimed is:
1. A seat, comprising:
 a seat cushion unit including:
  a seat cushion frame;
  a seat pad which lies over the seat cushion frame; and
  a trim which covers the seat pad, wherein the trim includes:

a trim main body which mainly covers a top surface of the seat pad;

a first trim joiner which extends from the trim main body to a backside of the seat cushion frame at the rear of the seat pad, and is fastened to the seat cushion frame; and a second trim joiner which is connected to a back surface of the trim main body in at least one of left and right end regions of the rear of the seat cushion unit, extends to the backside of the seat cushion frame at the rear of the seat pad, and is fastened to the seat cushion frame, the first trim joiner is a sheet-like part extending from the trim main body, and the second trim joiner is formed of a sheet member independent from the sheet-like part, the sheet member being connected to the back surface of the trim main body.

2. The seat according to claim 1, wherein the seat cushion unit includes a sitting part for supporting buttocks of an occupant, and a bulge part extending in a front-rear direction on each of left and right sides of the sitting part, the trim main body has a pull-in section which extends along a boundary between the bulge part and the sitting part, and is pulled into the seat pad side, and the second trim joiner is connected to the pull-in section.

3. The seat according to claim 2, wherein the second trim joiner is sewn with the pull-in section along a direction in which the pull-in section extends.

4. The seat according to claim 1, wherein the first trim joiner and the second trim joiner are fastened to a common member included in the seat cushion frame.

5. The seat according to claim 4, wherein the first trim joiner and the second trim joiner are fastened to the seat cushion frame via a common hook member which retains an end portion of the first trim joiner and an end portion of the second trim joiner.

6. The seat according to claim 5, wherein a distance from a proximal end joining position of the second trim joiner that is connected with the trim main body to a distal end joining position of the second trim joiner that is retained by the hook member is shorter than a distance from the proximal joining position to a joining position of the first trim joiner that is retained by the hook member.

7. The seat according to claim 1, wherein the second trim joiner has a lower stretchability than the first trim joiner.

8. The seat according to claim 7, wherein the second trim joiner is made of an airbag sleeve as a material.

9. The seat according to claim 1, wherein the first trim joiner extends throughout in a width direction of the trim main body, and the second trim joiner is each provided at opposite end regions of the trim main body in the width direction.

10. The seat according to claim 9, wherein the second trim joiner is each located so as to overlap widthwise opposite ends of the first trim joiner.

11. The seat according to claim 1, wherein a first hook member is provided on a distal end portion of the first trim joiner, via which the first trim joiner is fastened to the seat cushion frame, and a second hook member is provided on a distal end portion of the second trim joiner, via which the second trim joiner is fastened to the seat cushion frame.

* * * * *